United States Patent [19]

Eickmann

[11] Patent Number: 4,824,338
[45] Date of Patent: * Apr. 25, 1989

[54] PUMP ARRANGEMENT WHICH INCLUDES AXIALLY EXTENDING CYLINDRICAL RING NOSES ON CONED RINGS WITH A CENTERING RING AND SEAL RING RADIALLY OF THE FACE WHEREIN TWO OF THE RING NOSE ARE OPPOSITIONALLY DIRECTED AND LAID TOGETHER

[76] Inventor: Karl Eickmann, 2420 Isshiki, Hayama-machi, Kanagawa-ken, Japan

[*] Notice: The portion of the term of this patent subsequent to Oct. 20, 2004 has been disclaimed.

[21] Appl. No.: 87,849

[22] Filed: Aug. 17, 1987

Related U.S. Application Data

[63] Continuation-in-part of Ser. No. 788,174, Oct. 16, 1985, Pat. No. 4,701,113, which is a continuation-in-part of Ser. No. 853,244, Apr. 17, 1986, abandoned.

[51] Int. Cl.⁴ .................. F04B 43/00; F01B 19/00
[52] U.S. Cl. ......................................... 417/472; 92/42; 92/45
[58] Field of Search .............. 417/472, 473, 392, 401; 92/42, 45-48, 98 R, 102

[56] References Cited

U.S. PATENT DOCUMENTS

| | | | |
|---|---|---|---|
| 1,180,947 | 4/1916 | Scott | 92/45 |
| 1,190,716 | 7/1916 | Bowmann | 92/45 |
| 1,567,592 | 12/1925 | Hesselman | 92/42 |
| 1,580,479 | 4/1926 | Frankenfield | 92/45 X |
| 3,224,344 | 12/1965 | Baumann et al. | 92/45 |
| 3,394,631 | 7/1968 | Thompson | 92/46 |
| 4,483,665 | 11/1984 | Hauser | 417/472 X |
| 4,701,113 | 10/1987 | Eickmann | 417/472 |

FOREIGN PATENT DOCUMENTS

| | | | |
|---|---|---|---|
| 3226069 | 4/1983 | Fed. Rep. of Germany | 417/273 |
| 687254 | 9/1979 | U.S.S.R. | 417/472 |
| 465878 | 5/1937 | United Kingdom | 92/45 |

Primary Examiner—Paul F. Neils

[57] ABSTRACT

In the European patent application publication EP OS O No. 102 441 a high pressure pump is shown which uses tapered rings (disc spring derivatives) which are clamped together as a pump chamber. The clamping rings required cutting into sections which is expensive and time consuming. The present discoverings now show that the friction at compression of the coned rings was very large. The present invention now discovers that radially flexible ring portions should be provided to the coned ring portions in order to eliminate the friction and to reduce the time and cost of the production of the pump arrangement. The invention further provides U-type pump elements which eliminate the clamping rings. A second pressure led into the space in the housing which surrounds the pump elements makes it possible to increase the pressure in the pump, for example, to double the pressure.

3 Claims, 10 Drawing Sheets

$$dMd = q \cdot B \cdot \Delta R \, d\Delta R \quad (1)$$

$$B = \frac{\varphi \pi}{180}(r + \Delta R_i) \quad (2)$$

$$\text{OR} \quad B = \frac{\varphi \pi}{180}(R_0 - \Delta R_0)$$

$$dMdi = q\left(\frac{\varphi \pi}{180}\right)(r + \Delta R)\Delta R \, d\Delta R \quad (3)$$

$$Md = q \int \left(\frac{\varphi \pi}{180}\right)[f(\Delta R)] d\Delta R \quad (4)$$

$$Mdi = q\left(\frac{\varphi \pi}{180}\right)\left[\frac{r}{2}(\Delta R_i)^2 + \frac{1}{3}(\Delta R_i)^3\right] \quad (5) \quad Mdo = q\left(\frac{\varphi \pi}{180}\right)\left[\frac{R_0}{2}(\Delta R_0)^2 - \frac{1}{3}(\Delta R_0)^3\right] \quad (6)$$

$$\delta_B = \frac{M}{J}(S/2) \quad (7) \quad J = \left(\frac{\varphi \pi}{180}\right) RMC \cdot S^3/12 \quad (8) \quad M = Md(\Delta R)/(S/2) \quad (9)$$

$$\delta_{Bi} = q\left(\frac{\varphi \pi}{180}\right)\left[\frac{r}{2}(\Delta R_i)^2 + \frac{1}{3}(\Delta R_i)^3\right][\Delta R_i/(S/2)](S/2)/\left(\frac{\varphi \pi}{180}\right)S^3/12 \quad (10)$$

$$\delta_{Bo} = q\left(\frac{\varphi \pi}{180}\right)\left[\frac{R_0}{2}(\Delta R_0)^2 - \frac{1}{3}(\Delta R_0)^3\right][\Delta R_0/(S/2)](S/2)/\left(\frac{\varphi \pi}{180}\right)S^3/12 \quad (11)$$

$$\delta_{Bi} = 12q\left[\frac{r}{2}(RCM-r)^2 + \frac{1}{3}(RCM-r)^3\right](RCM-r)/RCM \cdot S^3 \quad (12)$$

$$\delta_{Bo} = 12q\left[\frac{R_0}{2}(R_0-RCM)^2 - \frac{1}{3}(R_0-RCM)^3\right](R_0-RCM)/RCM \cdot S^3 \quad (13)$$

$Rm = (R+r)/2$
$S = Centroid$
$Rgc = RADIUS\ FOR\ CENTROID$
$Rgc = (2/3)(R^3-r^3)/(R^2-r^2)$ $Rmc = $ EQUAL MOMENTS OF FLUID PRESSURE.
$Mdo = Mdi = \frac{r}{2}(Rmc-r)^2 + \frac{1}{3}(Rmc-r)^3 = \frac{R}{2}(R-Rmc)^2 - \frac{1}{3}(R\ Rmc)^3$
$Mod = Mid = \frac{r}{2}(RMC-r)^2 + \frac{1}{3}(RMC-r)^3 = \frac{R}{2}(R-RMC)^2 - \frac{1}{3}(R-RMC)^3$
= MOMENTS AROUND $Rmc$ AND $RMC$ RmcH AND RMCH GIVE EQUAL MOMENTS
OF AREAS AND INNER STRESS AROUND HOLDERS "H"

$\frac{Rmc}{2}(Rmc-r)^3 + \frac{Rmc}{3r}(Rmc-r)^4 = \frac{Rmc}{2}(R-Rmc)^3 - \frac{Rmc}{3R}(R-Rmc)^4$

$\frac{RMC}{2}(RMC-r)^3 + \frac{RMC}{3r}(RMC-r)^4 = \frac{RMC}{2}(R-RMC)^3 - \frac{RMC}{3R}(R-RMC)^4$.

MOMENT AROUND THE CENTER AXIS "O":
$dMdc = q\ BRdR;\quad B = (\varphi\pi/180)R$
$dMdc = q(\varphi\pi/180)RRdR.$
$Mdc = q\frac{\varphi\pi}{180}\int R^2 dR;\quad Mdc = q\frac{\varphi\pi}{540}(R^3-r^3)$
or: $Mdc = [Rgc(R^2-r^2)\ \varphi\pi/360]q$

Fig. 23

CALCULATION OF THE VOLUMES AND DELIVERY QUANTITIES:

$R_J; J$ = INDICE FOR INNER CHAMBER; $R_O; O$ = INDICE FOR OUTER CHAMBER
$\overline{R_J}$ = INTEGRAL MEAN RADIUS OF AROUND t-AXIS REVOLVING INNER FACE.
$\overline{R_O}$ = INTEGRAL MEAN RADIUS OF AROUND t-AXIS REVOLVING OUTER FACE.

$t = Y/tg\alpha; \quad Y = \frac{t}{tg\alpha} = tg\gamma \cdot t; \quad t = \frac{Y}{tg\gamma}$ $tg\gamma = \frac{R}{t}$ $tg\alpha = \frac{t}{R}$ $A = AREA = 0.5 (1/tg\gamma)dR; \quad V = VOLUME$ (6)

$(dR/dt) = tg\gamma; \quad dt = (1/tg\gamma)dR; \quad t = R/tg\gamma$ (7)

$V_J = \int \pi (\Delta R)^2 dt = (\pi/tg\gamma)(\Delta R)^2 dR = (\pi/3 tg\gamma)(\Delta R)^3$ (8)

$2(\overline{\Delta R_J})^1 \pi A = V_J = (\pi/3 tg\gamma)(\Delta R)^3$ (9)

$\overline{\Delta R_J}^1 = (\pi/3 tg\gamma)(\Delta R)^3 / 2\pi 0.5 t(\Delta R) = (\Delta R)^2 / tg\gamma \cdot 3t$ (10)

$V_O = t(\Delta R)^2 \pi - V_J = t(\Delta R)^2 \pi - (\pi/3 tg\gamma)(\Delta R)^3$ (11)

$2(\overline{\Delta R_O})^1 \pi A = [t(\Delta R)^2 \pi - (\pi/3 tg\gamma)](\Delta R)^3$ (12)

$\overline{\Delta R_O}^1 = [t(\Delta R)^2 \pi - (\pi/3 tg\gamma)(\Delta R)^3] / 2\pi 0.5(\Delta R)$ (13)

$\overline{\Delta R_O} = [t(\Delta R) - (\Delta R)^2/3 tg\gamma]/t$ (14)

CALCULATION BY MEDIAL INTEGRAL RADII OF REVOLVING FACES (AREAS):

$\overline{R_J} = R_J + \overline{\Delta R_J}$ (15)

$\overline{R_O} = R_J + \overline{\Delta R_O}$ (16)

$V_J = A 2 \overline{R_J} \pi = 0.5 t (R_O - R_J) 2\pi [R_i + (R_O - R_i)^2/3 tg\gamma \cdot t]$ (17)

$V_O = A 2 \overline{R_O} \pi = 0.5 t (R_O - R_J) 2\pi [R_i + \{t(R_O - R_J) - (R_O - R_J)^2/3 tg\gamma\}/t]$ (18)

CALCULATION OF THE VOLUME UNDER A REVOLVING INCLINED STRAIGHT LINE:

$R = \frac{t}{tg\gamma}; \quad T = \frac{R}{tg\gamma}$ $V = \int \pi y^2 dt = \pi \int (\frac{t}{tg\gamma})^2 dt = \frac{\pi}{(tg\gamma)^2} \int t^2 dt = \frac{\pi}{3(tg\gamma)^2}[T^3 - t^3]$ (19)

$= \frac{\pi}{3(tg\gamma)^2}[(\frac{R}{tg\gamma})^3 - (\frac{r}{tg\gamma})^3] = \frac{\pi}{3 tg\gamma}[R^3 - r^3] = \frac{\pi}{3} tg\alpha [R^3 - r^3] = \frac{\pi}{3} \frac{t}{R-r}[R^3 - r^3]$ (20)

$(R_J)^2 \pi t = VOLUME$

DEFINITION OF VOLUMES FOR FURTHER CALCULATIONS. "V" REPLACED BY DELIVERY "Q".

$Q_{JT} = \frac{\pi}{3 tg\gamma}(r_o^3 - r_i^3) = \frac{\pi}{3} \frac{t}{(R_O - R_J)}(r_o^3 - r_i^3)$ (21)

$Q_{JJ} = r_i^2 \pi t$ (22)

$Q_{JC} = Q_{JT} - Q_{JJ} = \frac{\pi}{3} \frac{t}{R_O - R_J}(r_o^3 - r_i^3) - r_i^2 \pi t$ (23)

$Q_{OC} = R_O^2 \pi t - Q_{JT} = R_O^2 \pi t - \frac{\pi}{3} \frac{t}{R_O - R_J}(R_O^3 - R_J^3)$ (24)

PUMP ARRANGEMENT WHICH INCLUDES AXIALLY EXTENDING CYLINDRICAL RING NOSES ON CONED RINGS WITH A CENTERING RING AND SEAL RING RADIALLY OF THE FACE WHEREIN TWO OF THE RING NOSE ARE OPPOSITIONALLY DIRECTED AND LAID TOGETHER

This is a continuation in part application of co-pending applications Ser. No. 60788,174; filed on Oct. 16, 1985, now U.S. Pat. No. k4,701,113, issued on Oct. 20, 1986 and 853,244; filed on Apr. 17, 1986, now abandoned.

DESCRIPTION OF THE FORMER ART

The mentioned European patent application publication corresponds in principle or at least partially to BRD (West German) DE OS No. 32 26 069, East German Pat. No. 207,403 or Japan patent publication SHO 58-34247.

This literature provides examples for pumps and motors including the arrangements which belong to a pump or motor which uses the coned ring portions. The literature also provides exact methods of calculation and designs of the technologies which are involved. However, the clamping rings are too complicated, too expensive, too time consuming in production and the element provide large friction at their bearing portions, whereby the efficiencies and powers of the devices of the former art are reduced. Other, older, former art is not able to produce high pressures of many hundred or a few thousand atmospheres.

DESCRIPTION OF THE PREFERRED EMBODIMENTS

Figure 1:
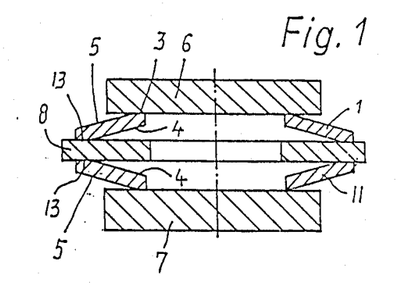
FIGS. 1 to 3 show sectional arrangements through geometric and mathematic arrangements for explanations.

In FIG. 1 tapered rings 1, 11 with axial inner faces 4 and axial outer faces 5 are provided symmetrically arranged on a medial plane ring 8 and they are sandwiched between covers 6 and 7. The radial inner ends of the coned rings meet the covers at 3 to be borne on the covers by local portions 3. The radial outer ends of the coned rings are borne on the medial plane ring 8 by local portions 13. When the covers 6 and 7 are pressed together, the springs or coned rings 1, 11 compressed axially and the space between them can be used to pump a fluid by the compression of the space 4, 50 between the symmetrically arranged coned rings 1, 11. The coned rings 1, 11 may also be called springs or disc springs, but they are in the invention commonly called "pumping elements" or "elements".

Figure 2:
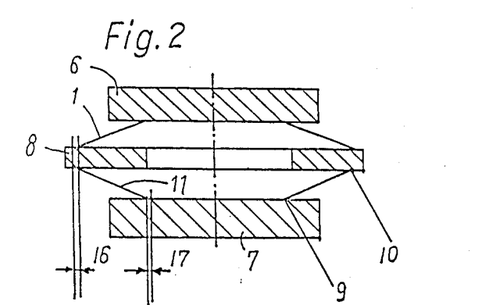

In FIG. 2 the elements 1, 11 are replaced by thin straight lines 1 and 11. When the plates 6 and 7 are pressed towards each other, according to the present invention, the local place 13 moves to the left, radially outwards, by distance 16 and the local place 3 moves to the right, radially inwards, by distance 17 in FIG. 2.

The movements of radial lengths 16 and 17 of FIG. 2 occur under very high pressure and cause a large friction. Also, the lengths of movements 16 and 17 are very small and often only hundredths or tenths of a millimeter, the loads at local portions 3 and 13 between the elements 1, 11 and ring 8 or cover 6 and 7 are very high, for example, multiples of tenthousands of a kilogram if the pressures in the chambers below the insides 4 of the elements 1, 11 are some thousand atmospheres. This high load causes, as the invention discovers, very large friction. The friction becomes so large that several thousand or more kilograms are needed to compress the elements 1, 11 which for compression without such friction would require only the force "A" of FIG. 5. In actuality, due to the mentioned large friction, the required force was measured in an example of the device as shwon by "E" in FIG. 5.

Figure 5:
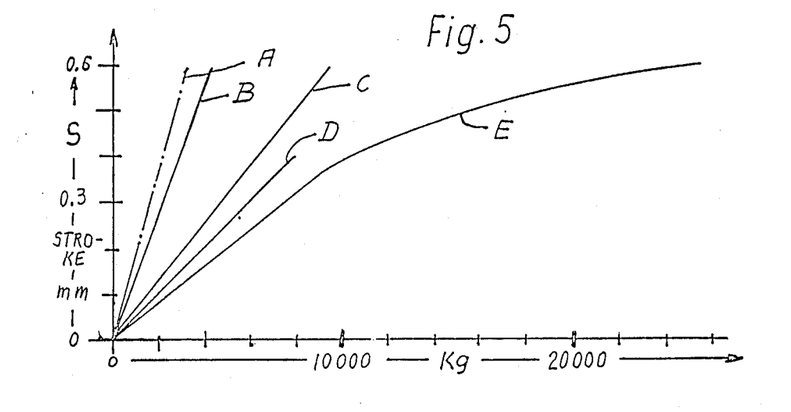

FIG. 5 thereby explains the forces in a schematic diagram which act on elements 1, 11 and on the therefrom improved elements of the present invention.

Figure 3:
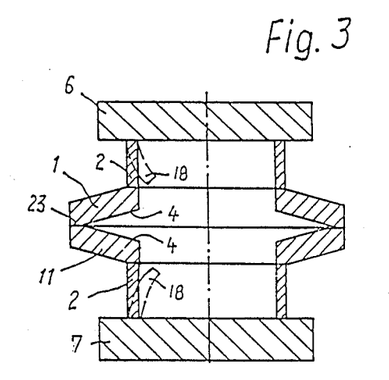

FIG. 3 explains, how some of the mentioned friction can be reduced or be entirely prevented. The distance ring portions 2 are placed in FIG. 3 between the elements 1, 11 and the covers 6 and 7 at the local portions 3. When now the elements 1, 11 are compressed, the inner ends of the rings 2 follow the movement 17 of FIG. 2 and eliminate all friction at local portions 3 of FIG. 1. The rings 2 are now in themselves partially radially deflecting springs which accumulate energy of inner stresses to be used later at the expansion strokes of the elements 1, 11. The friction of the arrangement of FIG. 1 became thereby reduced to values "C" and "D" of FIG. 5, with different values "C" and "D" for different diameters and lengths of rings 2 of FIG. 3.

Figure 6:
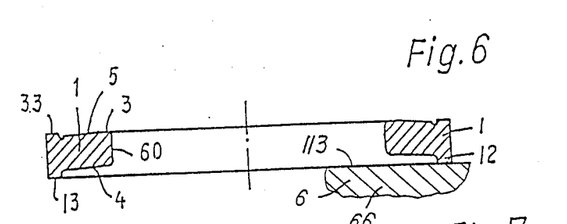
FIGS. 6 to 16 and 20 to 22 show sectional arrangements through devices of the invention.

FIG. 6 shows the element 1 of the invention, which obtained the best reduction of the mentioned friction.

Figure 7:
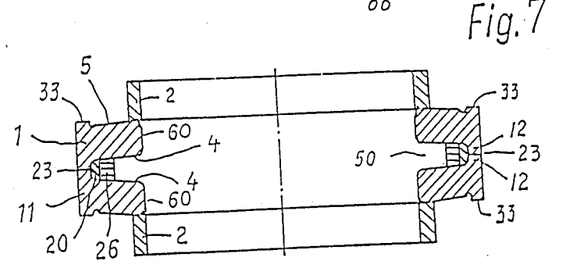

FIG. 7 shows two of the elements of FIG. 6 arranged symmetrically and provided with the rings 2 of FIG. 3. The best efficiency and reduction of friction was obtained with the present invention by FIG. 7 and the result is shown by "8" in FIG. 5. Therefrom it can be seen that the invention eliminated roughly 90 percent of the friction of FIG. 1, shown by "E" in FIG. 5 and the actual force to compress the elements 1, 11 is now, by the use of the present invention, close to the theoretical compression force due to internal stresses in the elements 1, 11 as shown by "A" in FIG. 5. Values "A" and "B" are now close together.

Figure 4:
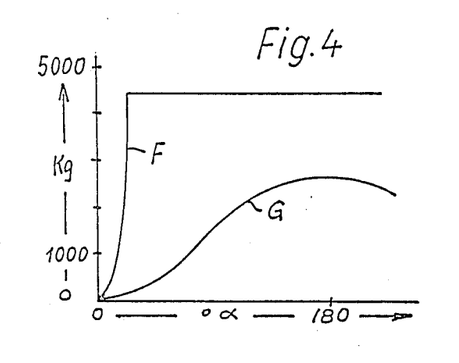
FIGS. 4, 5 and 19 show diagrams.

In FIG. 4 it is explained that it was tried by the invention to keep the local portions 13 of FIG. 1 on medial plane ring 8 and to expand the medial ring 8 equal and at equal time with the local expansion 16 of the elements 1, 11. This, the invention discovers, would have eliminated the friction at local portions 13 if it would have worked. According to the invention, however, it can not work, namely, the expansion at equal time can not work, because the pressure in the fluid increases over the rotary angle "alpha" of the cam drive for the compression of the elements, 1, 11 by the drive piston along curve "F" of FIG. 4, while the radial expansion of local portions 13 occurs along curve "G" of FIG. 4. Since curves "F" and "G" are unequal, they show a different movement at different time, and, consequently, the medial ring 8 of FIG. 1 will never expand equally and at equal time with the movement 16 of local portions 13 of FIGS. 1 and 2.

FIGS. 6 and 7 now illustrate that the invention has made use of this discovery and provided a novel element 1 which does not need and not use the medial plane ring 8 in order to eliminate by the invention of element(s), 1, 11 of FIGS. 6 and 7 the friction on the former medial plane ring 8 which in the mentioned former art was called "the outer ring". According to the invention, element 1 is now provided on its radial outer end with an axially inwardly extending portion 12 which has the local bearing face 13. FIG. 7 shows that a centering ring 20 is inserted radially inwardly of the axially extending portions 12 of a pair of symmetrically arranged elements 1 and 11 to center the mentioned elements around a common axis. This center ring 20 is radially rather short, for example, its radial extension is only a minor fraction of the radial extension of the adjacent coned ring elements 1 and 11. The elements now meet each other directly at bearings 23 which are the bearing faces 13 of the elements 1 and 11. If this arrangement becomes axially compressed between covers 6 and 7, as in FIG. 1, the meeting and bearing face arrangement 13, 23, now expands equally at equal times by the radial length 16 of FIG. 2 and all the friction of movement 16 along the former ring 8 is now completely eliminated. Radially inwards of the centering ring 20, which meets the inner faces of portions 12 and keeps them aligned, a plasticly deformable seal ring (O-ring, gum-ring, teflon ring) 26 is inserted to prevent escape of leakage out from the internal pumping chamber 50 between the axial inner faces 4 of the symmetrically arranged elements 1 and 11 of the type(s) of FIG. 6. The radially flexible rings 2 of FIG. 3 may be assembled and the elements have now the important inner faces 60, which will have to be sealed. The elements 1, 11 further get the clamping bearing portions 33 on the axially rear radial outer portions of the elements 1, 11 to be set into the clamping portions 42 of the clamping rings 27, 28 of FIG. 8.

Figure 8:
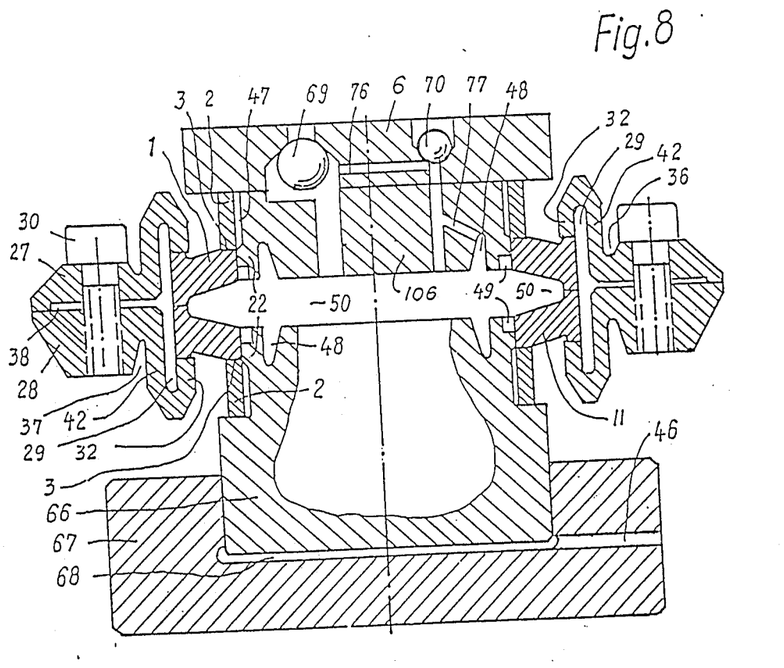

FIG. 8 illustrates an example of a complete arrangement of the invention which commonly acts as a high pressure pump, for example, also for pumping of non-lubricating or of corroding fluid like water etc. The pumping chamber 50 is provided between the elements 1 and 11 of FIG. 7. The clamping rings 27 and 28 are clamped strongly together by bolts 30. However, the invention discovered that the clamping rings of the former art still had large friction between the clamping segments of the rings and the elements. Therefore, in order to eliminate this additional friction of the former art, the present invention provides the ring grooves 29 in the clamping rings 27 and 28 in order to form the radially flexible holding ring portions 42 of the invention, which now face the holding faces 33 of elements 1, 11 of FIG. 7 and thereby fasten, keep and hold the symmetrically arranged elements 1 and 11 together. At the radial expansion and contraction 16 of FIG. 2 the ring portions 42 of the invention follow the movement 16 of the elements 1, 11 and the mentioned additional friction of the former art is thereby eliminated. An additional, oppositionally directed additional ring groove 37 may be provided to form an additional radially flexible ring portion 32 on the clamping rings 27 and 28. The later FIG. 11 will, however, show that such an additional ring groove 37 may soften the strength of the clamping rings and may be spared or eliminated. The head cover 6 is provided with the inlet valve 69 and the outlet valve 70, as known in the art. The drive piston 66 is axially moveably provided in drive cylinder 67. Fluid under pressure is periodically alternatingly led through connection passage 46 into the bottom 68 of cylinder 67 to press the piston 66 periodically up and let it periodically move down, thereby periodically alternatingly compressing and expanding the elements 1 and 11. The supply of fluid through passage 46 and its fluid flow out in periodic cycles may be provided as in the mentioned former art of the same inventor.

FIG. 8 contains in addition the following novel arrangements and provisions of the present invention:

The passage 76 leads from the bottom of the inlet valve to the outlet valve in order to let any air or gas which might collect below the inlet valve escape through the outlet valve to prevent the collection of efficiency limiting air in the device. Similarly the passage 77 leads the air out of ring groove 48. The sending out of air occurs automatically because the passages 76 and 77 are set at the highest places where the air, which is lighter than the pumped liquid, would automatically collect. The clearances 47 are provided between the rings 2 and the insert 106 below head cover 6 in order to permit the radial movement 17 of the rings 2. A very important novel arrangement of the invention is the provision of radially flexible seal bearer lips or seal lips 22 on the piston 66 and the input 106 below the cover 6 The seal lips 22 are formed by the provision of the ring grooves 48. The fluid from pumping chamber 50 enters into grooves 48 radially inwards of the seal lips 22 and thereby presses the seal lips 22 radially outwards under the pressure of fluid from the inside and thereby presses the seal lips or its seal lip corners against the inner faces 60 of elements 1 and 11. The inner faces 60 were seen in FIG. 6. The dimensioning of the radial wall thickness of the seal lips 22 and of the axial lengths of them which are defined by the depths of the grooves 48 are important parameters to make the radial movement of the seal lips and thereby the seal on the inner faces 60 of elements 1, 11, effective. The chamber 50 is then effectively sealed. For pumping of corroding fluid of high pressure, the elements 1, 11 and the seal lips 22 are made often by VEW stainless steel, by US steel 17 PHc.H. or by Japanese stainless steel SUS 630. At a perfect design the seal lips 22 may seal effective on elements 1, 11. In other cases and in most practical applications, flexible seal rings are inserted into seal ring grooves 49 on the seal lips 22 to meet the seal lips and the elements to seal between them.

Figure 9:
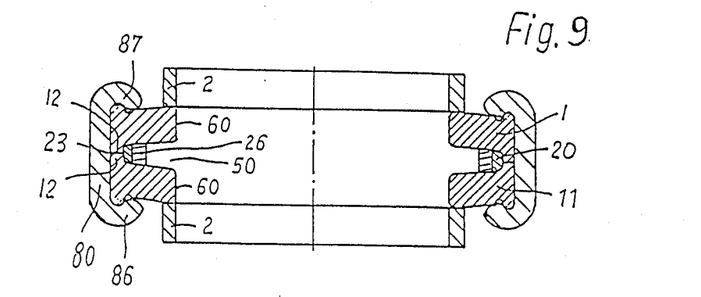

In FIG. 9 the clamping rings 27, 28 of FIG. 8 are replaced by a board ring 80, which axially embraces the ring elements 1 and 11 axially from outside by boards 86, 87 and keeps them together. The arrangement of a board ring 80 is not new, but known in the art, while, howewver, the insertion of the centering rings 20 of FIG. 7 and the provision of the portions 12 on the elements to meet at planes 23 is a novel arrangement and provision of the present invention.

Figure 10:
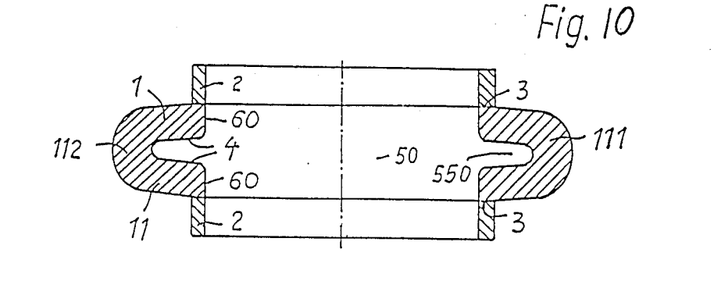

FIG. 10 shows another important provision of the present invention, namely the U-element 112. It combines two tapered ring portions, and thereby the symmetrically arranged elements 1 and 11 connected together by the outer, arched, portion 111. The element 112 is thereby a "one piece" or integral double element 1, 11. It is produced from a bar or pipe by lathing the outcuts 550 from radially inside into the element 112. In case of plstic elements, the groove 550 is otherwise formed. This U-element of the invention combines simplicity with reliability. The radially flexible portions 2 may be provided on the axial ends of the elements 112 and, if two of the elements 112 are laid axially together, a seal lip bearer portion may be inserted into the inside to meet and seal neighboring inner faces 60 of two neighboring U-elements 112.

Figure 11:
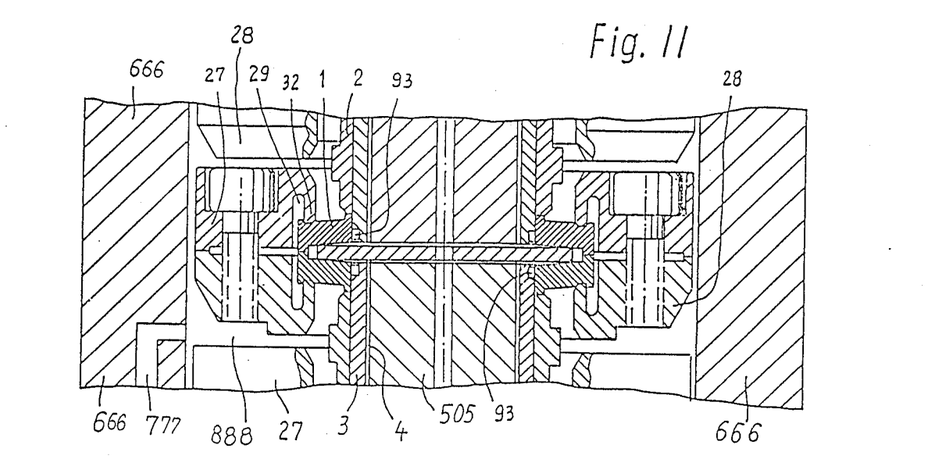

FIG. 11 shows that the clamping rings 27, 28 have only grooves 29 and holding ring portions 32 in this embodiment but not the ring grooves 37 of FIG. 8. The week portions 32 of FIG. 8 are thereby eliminated. For low pressure devices the arrangement of FIG. 8 may be preferred while for high pressure devices the clamping rings of FIG. 11 are commonly used. The Figure also shows that a housing 666 should surround the entire arrangement in order to keep the head cover 6 and the cylinder 67 of FIG. 8 together.

An important novelty and provision by this embodiment of the invention is that a passage 777 may be provided in the housing 666 or at any other suitable place to lead a fluid under pressure into the interior space 888 of housing 666 in order to have a pressure in the interior space 888 which surrounds the clamping rings and elements. The elements are then subjected to the pressure in space 888 from the outside and to the pressure in chambers 50 from the inside. By providing a second pressure in space 888 the pressure in pumping chambers 50 can become increased, because the elements 1, 11 work under a specific difference of pressures from inside and outside before they break under the pressure. The provision of passage 777 to lead fluid under pressure from a respective source of pressure into the interior, but sealed, spare 888, can thereby easily double the pressure in pump chambers 50, for example, from 1000 to 2000 atmospheres, from 2000 to 4000 atmospheres, or the like, if the second pressures in space 888 are the 1000 or the 2000 atmospheres in the mentioned samples of pressure. The Figure also shows that upper and lower sets of clamping rings and elements may be provided above and below a respective set in order to operate a plurality of sets of FIG. 7 axially of each other for obtaining a high quantity of delivery volume.

Figure 12:
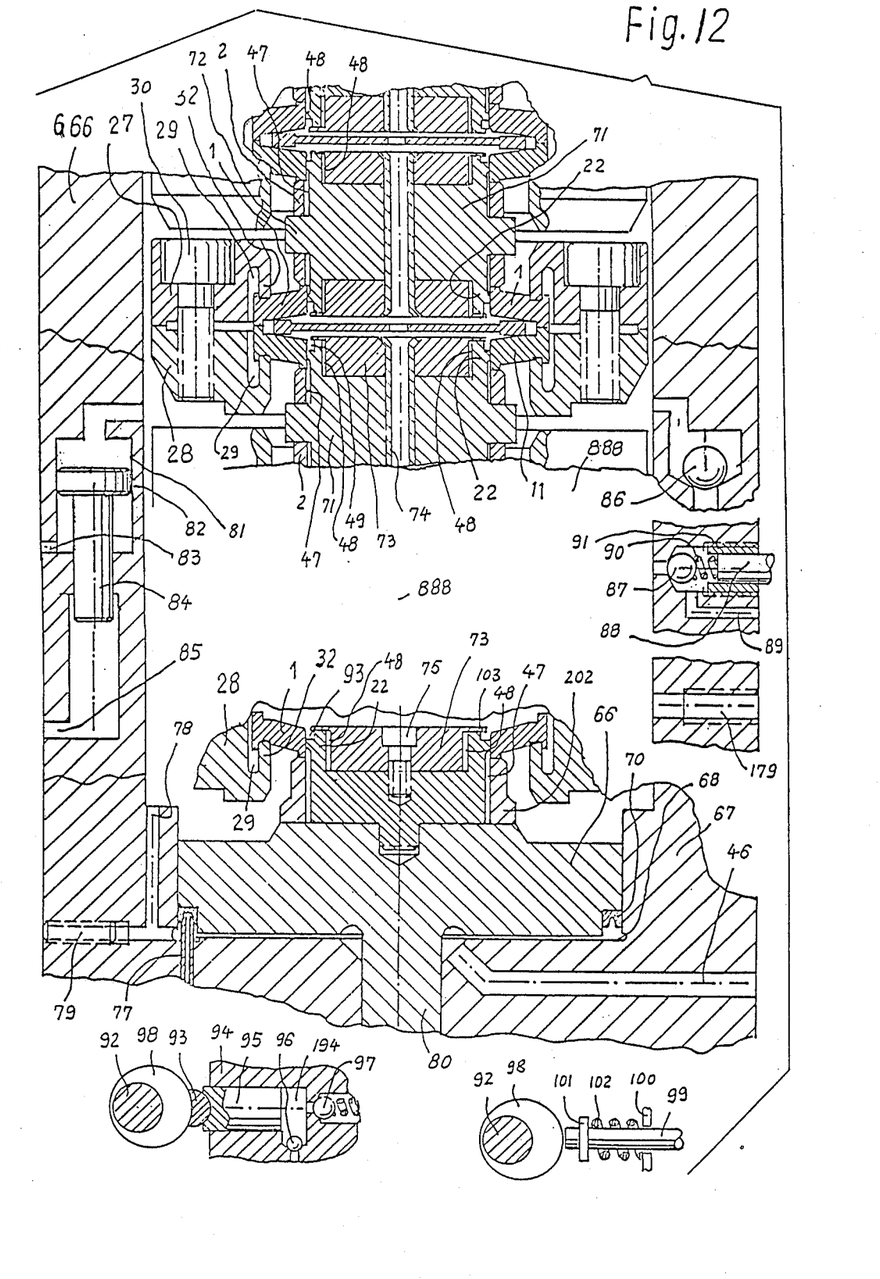

FIG. 12 illustrates again the housing 666 with pumping arrangements with clamping rings and elements therein. Since they are already known from FIGS. 6 to 8 and 11, they are not repeated in the description of FIG. 12. Passage 46 leads the alternating drive fluid into and out of cylinder 68 to operate the reciprocation of drive piston 66 while seal 68 seals between the mentioned cylinder 67 and piston 66. A pipe 77 may be provided to take automatically, or manually operated, the air out of the seal groove or seal 70. Fluid under second pressure may be supplied through passage 79 into the interior space 888 in housing 666 Alternatively pressurized fluid may be supplied through passage 179. Passage 179 may also serve alternatively as a connector for control of the pressure in space 888 in housing 666. Passage 78 may be provided and meet passage 79 in order to have a port at a specific height or location in or on space 888 in housing 666. Pressure control means and timed fluid or fluid pressure supply means may be added to the space 888 in housing 666 as, for example, by the following alternative arrangements:

Cylinder 81 may have axially moveable therein piston 82 with piston shaft 84 communicating to passages 83 and/or 85 at the specific locations; valve 86; valve 87 with spring 90, piston 88, adjuster or guider 91 and/or passage 89; or other suitable fluid pressure supply and control means. The passages 46, 79, 179 or others may be communicated to exterior fluid handling chambers, like, for example, cylinder 194 in housing 94. Piston 95 running with its piston shoe 93 along the eccentric outer face of cam 98 of shaft 92 may then send fluid through the medial passage 46 between cylinders 194 and 68 into and out of cylinder 68. The piston 95 is then the primary piston or "giver piston" while piston 66 is then the secondary or "following piston" of the reciprocating fluid column between and in primary cylinder 194 and secondary cylinder 66. In such case no valve 97 is used. In other cases or provisions, the chamber 194 may be used as a pumping chamber and then have inlet valve 96 and outlet valve 97. The shaft with the eccentric cam 98 may also be used to drive a control piston 99 and let it return under the spring 102 between the retainers 100 and 101 on piston 99 and a stationary portion 100. The mentioned shafts 92 with cams 98 can by utilized for the handling or control of pumping arrangements of the invention and of the Figures thereof, particularly, if they are suitably dimensioned respective to the parts or portions with which they are associated for cooperation. The pistons 95, 99 and 66 are not in scale in FIG. 12. It may be noted, however, that the primary pistons like 95 commonly have much smaller diameters but longer strokes than the secondary pistons 66 since the following pistons commonly in high pressure devices of the invention act against many tons of force while the primary, giver pistons are limited in axial load by the bearings of the revolving shafts 92.

Figure 15:
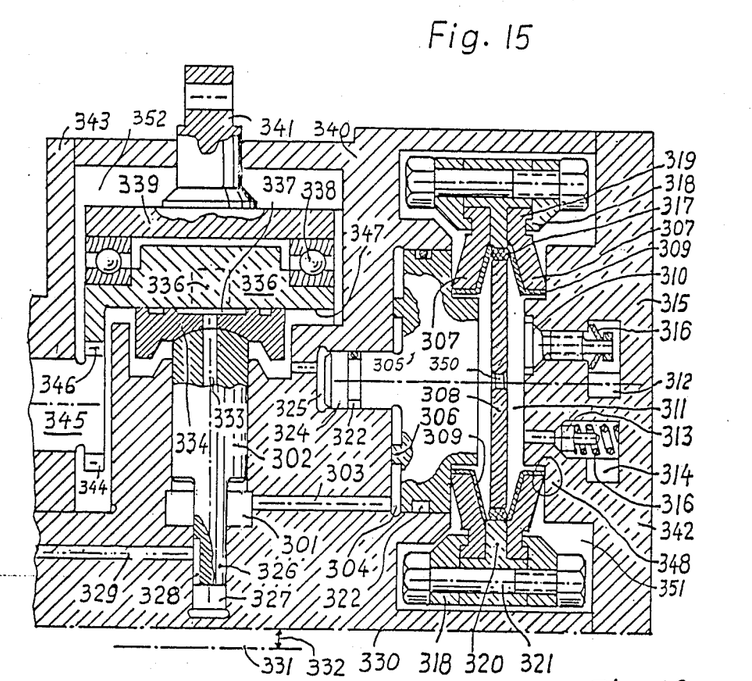

Details of samples of structure and function of the control of flow of fluid into and out of cylinder 66 can be obtained, for example, from FIG. 15.

Figure 14:
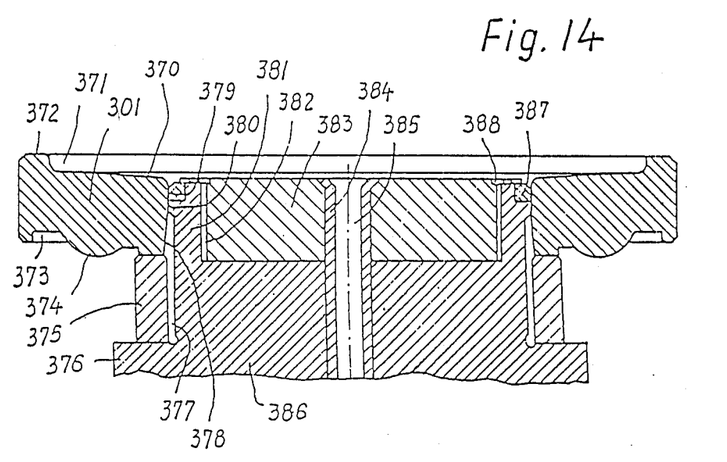

The elements 1, 11 are very thick, as will be especially seen from FIG. 14. This corresponds to the calculation Figures of this application and is further obtained by actual testing. The inclination of the face 4 of FIG. 6 is relative to the bottom line of the Figure about 1.6 degrees and the stroke is about 0.2 mm for a life time of 30 million strokes of an element of FIG. 14 for 1500 atmospheres in the inner chamber 50, 35 when no pressure exists in the elements 1, 11 surrounding chamber or outer chamber 35.

Figure 13:
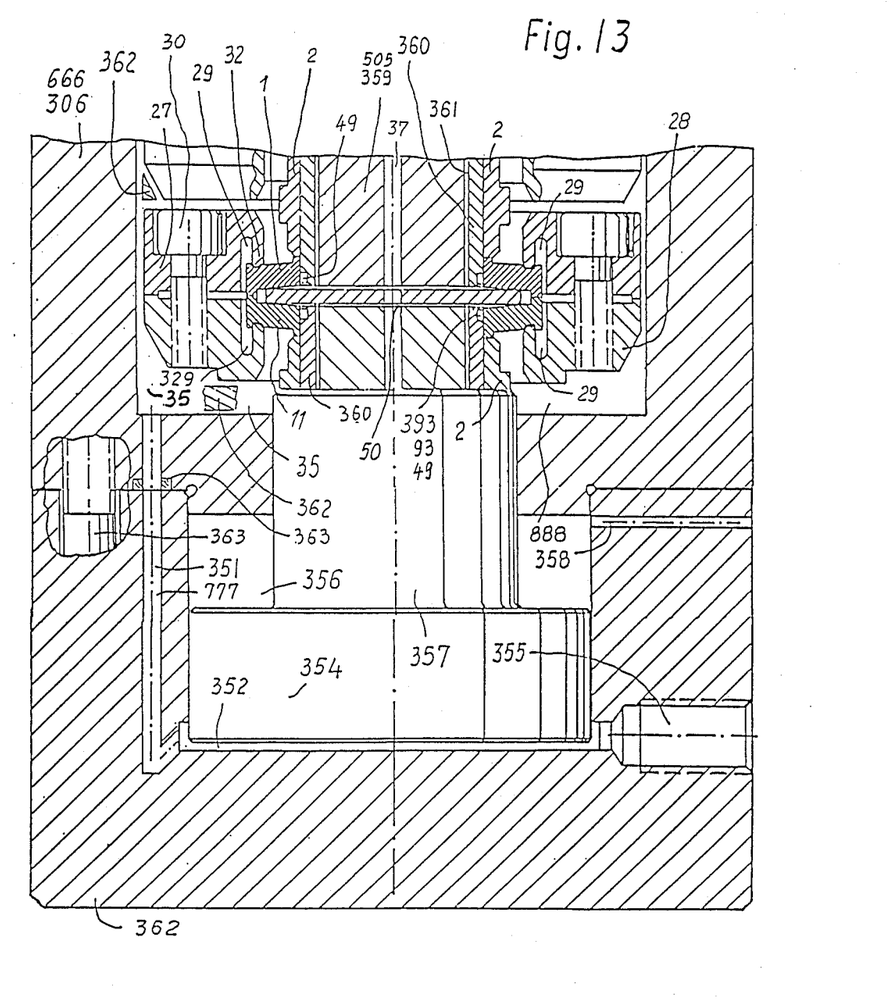

The working chamber 50 may also be called "inner chamber", because it will soon become apparent that a pump may also have an "outer chamber" as specifically will be seen at hand of FIG. 13.

A sample of the pump system is also shown in FIG. 13.

Housing 362, 306 has a cylinder 352 wherein a piston 354 is reciprocably mounted. Pressure fluid is supplied from a respective source through entrance port 355. The piston has the piston shaft 357 of smaller diameter respective to the mentioned piston and is guided in a portion of housing 306 while passage 358 permits the entrance and exit of air to prevent compression of fluid in the space between piston 354 and housing portion 306. On top of the piston shaft the arrangement of the pumping elements is assembled. The basic elements 1, 11 form between them the inner chamber 50 or 37. These basic high pressure elements may be called "N-elements" since they are the ring nose elements of the earlier discussion. Between the elements and neighboring parts are pipe portions 2 provided with the inner axial ends of the elements laid onto them. The purpose of these pipes, which serve as distance rings, is that they follow the radial expansions and contractions of the elements to prevent friction between on each other sliding faces under high axial load. The N-elements are clamped together by the clamping rings 27, 28 with bolts 30. The clamping rings are provided with annular ring grooves 29 to form the thereby radially expandable and contractable clamping lips 32 which embrace the earlier discussed faces of the high pressure elements. The ring noses are laid together and the seal bed radially of them is formed and limited in radial inwards extension by the inner dead space filler rings. Seal lip bearers 360 are provided and extend into the elements to form seal ring seats 49. The seals in them seal the inner faces of the elements. Since the seal lip bearers are subjected to high pressure from the inside, they press their lips and seal ring seats radially against the elements to seal it. Respective clearances 361 are provided. Dead space fillers 359 are provided also. Sofar the basic system of the "ETEW" type is described whereby it is to be understood that a head cover 6 with the valves must be provided on the topmost end of the assembly of plural sets of elements.

The speciality of this Figure is that pressure is led from cylinder 352 through passage 351 into the space in housing portion 306, cited by 350, which surrounds the element assemblies as an outer chamber, known as 35. Dead space fillers 362 may be provided to eliminate or reduce losses by compression of fluid. The pressure in the inner chamber 37 inside of the elements will built up higher than that in the mentioned cylinder and in the outer chamber. However, while the ETEW system basically works with pressure only in the inner chabmer, the in this Figure provided outer chamber reduces the pressure difference inside and outside of the elements and thereby makes a higher pressure in the inner chamber possible. At proper design the pressure in the inner chambers may be doubled by the speciality of the arrangement of this Figure.

FIG. 14 shows a portion of the arrangement of a basic high pressure N-element separately illustrated. Element 301 is axially borne on the distance ring 375, which is in turn borne on the base body or piston 386 which forms for the bearing of the distance ring the seat 376. The radial inner face portion 380 of the element 301 is cylindrical and ends in a slightly coned rear face portion 378. Piston 386 forms the seal lip bearer portion 381 with the seal ring 387 inserted into the seal ring seat of the seal ring bearer 381. To permit the radial expansion and contraction of the seal ring bearer, it has an interior recess 382. The dead space in it is filled by dead space filler 383, fastened to the piston 386 by holding pipe 384 with bore 285 while the lip 388 of the filler holds the seal ring in its seat. A clearance 382 remains to permit the entrance of the high pressure inner chamber fluid radially inside onto the seal lip bearer 381, while clearance 377 permits the radial contraction of the distance ring 375. The ring noses 372 of the element are shown, the tapered inner face of the element is 370, its rear outer face is 374 and its seat face for the setting of the clamping lips 332 of FIG. 99 is shown by 373. Note the axial thickness of the N-element for high pressure of 1500 to 2000 atmospheres in a pump without pressure in the outer chamber.

Since in the embodiments and Figures which show complete pumps or major portions thereof, there is not much space in the Figures to show all details of the elements, the elements are in such Figures illustrated somewhat simplified or out of scale. For high pressure of more than 1000 atmospheres the elements in the mentioned Figures are, however, substantially of the configuration of FIGS. 14 or 6, thicker relative to their radial cross sections than usual Belleville or disc springs.

Attention is now given to the pump in FIG. 15, which is a pump for the non-lubricating and corrosion providing fluid. Since corrosive fluid disturbs the clearances between corrosion-prone materials like steel, iron and the like, the third pump is in my invention a pump with no sealing parts under movement relative in a close clearance to a neighboring face.

Therefore, the third pump is provided with at least one tapered pump element 307. In the Figure there are two tapered elements 307, which are opposing each other with the hollow cones. The at least one tapered element has an inner end face axially on its radially inner portion and an outer end face on its axially inner end on it's radial outer portion. The radial outer portin of the tapered element is clamped onto an adjacent part of the pump. For example, to the outer end of the second piston 305, to the housing interior face portion of housing 340 or end cover 342 - (343 is the front cover of housnig 340)-or to the opposed second tapered element 307. In FIG. 108 there are two tapered elements 307, open towards each other with their hollow cones to form therebetween the third pump chamber 311. A medial outer ring 320 is inserted between the radial outer portions of the elements 307. The clamping arrangement consists of clamp portions 318, which may be angularly cut into separated clamps, which embrace the radial outer ends of the tapered elements 307 and the medial outer ring 320. Respective fingers of the clamps may engage into grooves or recesses in the radial outer end portions of the tapered elements 307 to prevent escape of the clamping means 318 from the tapered elements 307. Holders, for example, bolts with nuts, are keeping the clamps 318 fastened strongly together. A seal ring, for example, an O-ring 317 is inserted between the tapered elements and the outer ring, 320, to seal the interior third pumping chamber 311 radially agains the medial outer ring 320. Seal sheets 309 are set innermost around or along the tapered elements 307 to prevent the corrosion providing third fluid from meeting the walls of the tapered elements 307. The O-ring 317 also seals along these seal sheets or protection sheets 309. A medial inner ring 308 is inserted between the two tapered elements 307, holds the O-ring 317 in its place, is provided with a passage 350 to communicate the both chamber portions of chamber 311 on both ends of the medial inner ring 308 with each other and also serves as a dead space filler to reduce internal compression losses in the third fluid at very high pumping pressure. The entrance and exit valves 310 and 313 are communicated to the third pumping chamber 311 and serve as inlet and outlet means for the third fluid. The operation of the device of FIG. 15 is now as follows:

The first piston is driven by the drive means, for example 345 and the guide face 347. The first piston drives with the first fluid through the intermediate or internal passage 303 the second piston 305 in the second cylinder 304. The head of the second piston 305 bears the inner end of the left tapered element 307 and compresses it. Since the third pumping space 311 is completely sealed, has no moving relative close faces, and since all parts bordering the third space are protected from meeting the third, corrosion providing fluid, the second piston 305, compresses the tapered pumping elements 307, presses the third fluid out of the third pumping chamber 311 through the outlet valve 313, while it at the same time closes the inlet valve 310.

When thereafter the first piston 302 reverses the direction of its stroke, the tapered elements 307 act under their compression stress as springs and drive the second piston 305 inwards in the second cylinder 304. The first fluid from cylinder 304 passes through passage 303 into the first cylinder 301 and the inlet means 310 opens and draws the new third fluid into the now expanding third pumping chamber 311.

So far the device is easily to be understood and its operation looks rather simple. In practice however, for the very high pressures in the third fluid, which my device is able to manage, quite a substantial "know-how" is required. Some of such "know-how" is explained at the description of the following figures.

My device is commonly driven by my hydraulic motors, which means, that my hydraulic motor drives the driving shaft 345. The motor is then a complete unit together with the device of FIG. 15. In other applications the drive means is driven by combustion engines or electric motors. Until now my device has been operated with water as the third fluid and with pressures of 1,000 atmospheres, corresponding to roughly 15,000 pounds per square inch. It is however my intention to increase the pressure of the third pump chamber 311 considerably higher for example, close to 50,000 pounds per square inch. The efficiency at 1000 atmospheres was quite good.

A first "know-how" for example, is, that common disc springs, which are also known as "Belleville springs" are not suitable for use as tapered elements in my pump. They break already after 40,000 strokes. But in my device the lifetime of the tapered pumping elements shall be about several ten million strokes, amounting to thousands of hours of life time under highest pressure in the corrosion-active third fluid.

I obtain this coned by using tapered elements with a relatively big inner diameter but with a rather small radial extension relative to the mentioned inner diameter. That reduces the stresses in the tapered pumping elements 307. Further important, for good efficiency of the device unavoidable is the setting of the clamping means 307 and the subjection of the tapered elements to short strokes of deflection of the tapered elements 307. It is therefore important under the "know-how" to use big differences of diameters of the first and second pistons 302 and 305 of the device. Further "know-how" will be explained at the description of the following figures.

Figure 16:
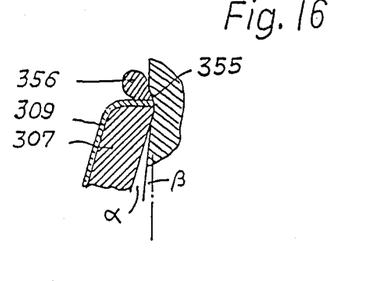

FIG. 16 shows an enlargement of portion 348 of the device of FIG. 15. The tapered element 307 changes its angle relatively to the cover's inner face from angle alpha to beta during the compression. That would lift the edge of the inner end of the tapered element away from the cover face of cover 342. The seal ring 356 would then enter into the opening gap and disturb itself. The seal would be disturbed and the pump would not work any more. It is therefore suitable to form the inner seat face of the cover 342 with a small dell of suitable configuration and angle, wherealong the inner edge of the tapered element 307 can slide at compression and expansion without departing too much from the support face. Thereby the entering of seal ring 356 into a gap is prevented, because the appearance of the gap is either prevented or reduced in such an extent, that the respective portion of the seal ring 356 can not any more enter into a gap and thereby can not disturb itself.

For plural third pumping chambers 311, a common inlet space 312 may be provided to the inlet valves 310 and a common pressure fluid collection chamber 314 may be provided to the exit valves or delivery valves 313.

Another important "know-how" is, that in my tapered elements 307 the internal stresses due to compression of the tapered ring element, as generally known from Almen and Laszclo for Belleville springs, are minor compared to the more sudden appearing stresses under fluid pressure from the bottom of the respective elements 307. The stresses are called in FIG. 17 "sigma Bi" for the stress found from the inner moment and "sigma Bo" for those found from the outer moment of the radial outer portion of the element.

Figure 17:
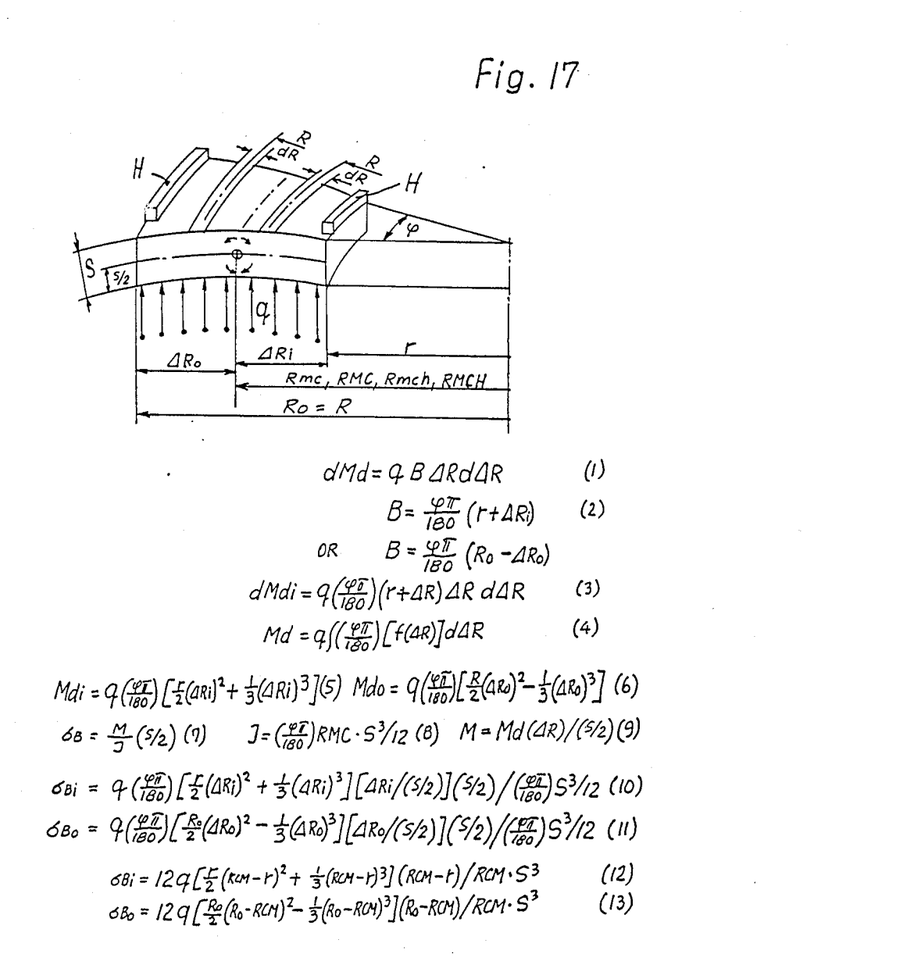
FIGS. 17, 18 and 23 show concepts of geometry and mathematical equations.

In FIG. 17 the tapered element portion of element 317 is kept between the holders "H" and the fluid pressure "q" is acting from the bottom in axial direction against the element. The element then bows upwards out under such fluid pressure, as the Figure demonstrates. Thereby the inner stresses "sigma" occur in the element. FIG. 17 also demonstrates, how I derived the calculation formulas. The outer moments which occur under the fluid pressure along the radial distances "delta R" are cited by: "Md". But the inner moments inside of the elements 307 are cited by: "M", whereby "M" is the distance "delta R" divided by the half of the thickness "S" of the element. The Figure shows portions "dR" on radius "R" to find the differential and integral calculus. "I" is the moment of inertia of the element-portion between the radial angle "phi". "B" would be the width, if the portion of the element would not be a portion of a ring in boundaries of the angle "phi". The width would then be a constant. Note please, that the integration is not starting from the axis of the element, but the uncommon integration, which I do, starts from the inner diameter of the element, while the moment of inertia and the width of the element between the boundaries of angle "phi" go into the integration from the center-axis of the element.

The radius, at which the moments from the inner delta radius portion and the outer radius portion "delta Ri" and "delta Ro" are giving equal moments "Md" is called by me: "Rcm". The radius, where the said outer moments give equal moments around the holders "H" is called by me: "Rcmh".

The radius, which gives equal inner stresses because of inner moments "M" inside of the element, is called by me: "RCM"; while the radius which would give equal inner moments and stresses around the holders "H" is called by me: "RMCH". These radii are found by graph, whereupon a final respective value is then repeated by the exact calculation with the respective nearly final value, until the exact values are found.

It is important here, to understand, that these values are different from the arithmetic mean of "R" and "r", when "R" is the outer and "r" is the inner radius of the tapered element 307. The medial radius of the gravity centre "Rgc" of my control body patents is also different from the above values, because it considers the ares of the section, but not the moments of it.

Figure 18:
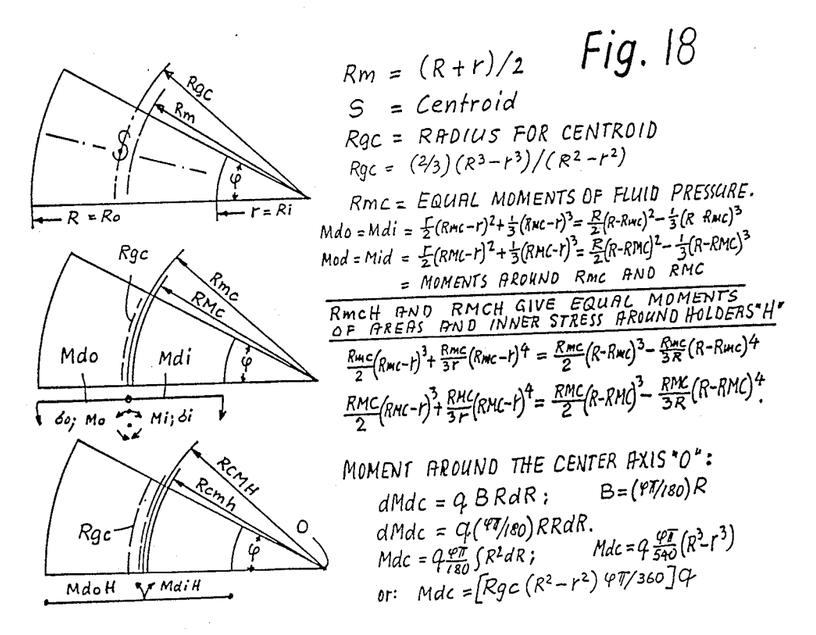

The different location of the mentioned radii (medial radii) for the respective purposes are for demonstration of their location substantially shown in FIG. 18. Actually they are closer together, than in FIG. 18. But they can not be drawn closer in the Figure, because the lines of the ink would be too bit compared to the small radial distances. Of interest is also, that the recess(es) or groove(s) for the clamp 318 does (do) not disturb the life time of my tapered pump element 307, because the groove is placed there, where the inner stress in the element is small.

FIG. 18 shows in a schematic demonstration the principal locations of the novel radii Rmc, RMC, Rmch and RMCH in comparison to the arithmetic medial value Rm and to the radius Rgc of my older patents, which corresponds to the radius of the centroid of an element of the pumping element 307. The respective equations, which I have derived, are writted also in FIG. 18.

Figure 19:
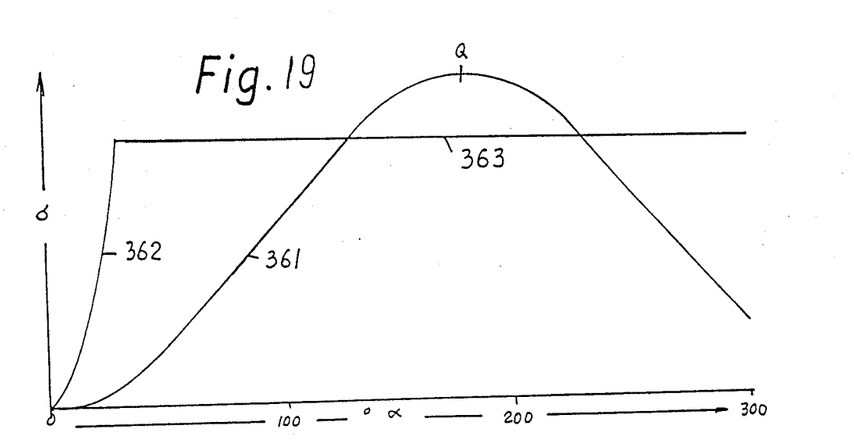

FIG. 19 demonstrates in a schematic the different stresses inside of the pumping element 307 over the rotary angle alpha, wen drive means an eccentric outer face of a cam is used to drive the respective piston and when a radial difference appearing from pivotation of a piston shoe is neglected as neglectible small. Curve 361 shows the highest internal stress in the pumping element 307 which is due to mechanic compression of the element by the second piston. It is seen here, that this curve is rather smooth and has no stiff rises of the stresses. Curve-line 362-363 however shows the stresses, maximum thereof, which are due to the fluid pressure in the third pumping chamber 311. It is visible from the left curve 362, that this stress is appearing much more suddenly, than the stress which is due to the mechanical compression of the element 307 by the second piston 305. Once the maximum of stress 362 is reached, the stress remains constant along line 363, because the delivery pressure of pumping chamber 311 is now constant. The sudden increase in stress along curve 362 shows, that this stress damages the life time of the pumping element 307 more, than the more slowly appearing stress of curve 361.

The actual delivery quantity of the first pump, the second motor and the third pump is parallel to curve 361 of FIG. 19 over the rotary angle alpha of the piston stroke drive and guide means.

Figure 20:
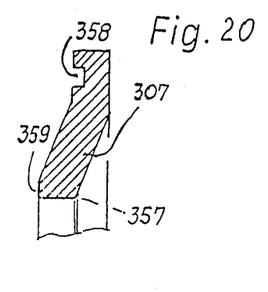

FIG. 20 shows a portion of the element 307 of FIG. 15 in sectional view in a separated demonstration to indicate, that the groove 358 for the reception of the respective portions of the clamping arrangement 318 can be cut until one third of the thickness of the element 307, because this place is a place of small internal stress in the element 307. The inner corner 357 should be rounded in order to soften the internal stresses here. Good care must be taken for the inner axial outer end 359. This should never be a line as in common Belleville springs, because a line would bring too big stresses. It should be flattened substantially to a plane face.

Figure 21:
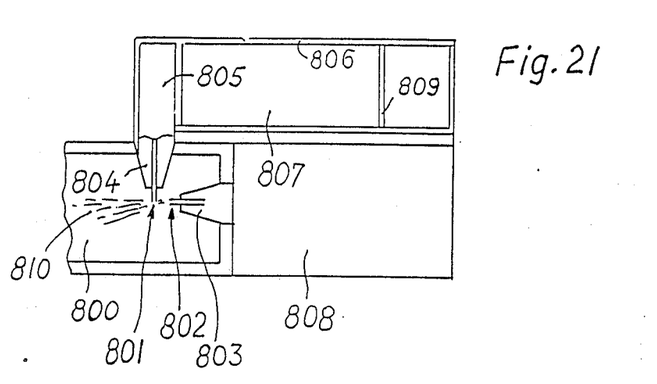

FIG. 21 demonstrates in a schematic a novel fuel injection system for a combustion engine of my invention. It is best applied to my pressed and cleaned coal combustion engine of my co-pending patent application Ser. No. 06-922,481 or to others of my co-pending patent applications. Instead of pressing the cleaned coal to blocks, in this embodiment of the invention, I compress them to wires or flat long bands of small thickness and inject and pulverizes the fuel of coal by leading a high pressure liquid jet against the inwards moving fuel wire or tape. This immediately pulverizes the coal to a coal-liquid stream, at which the liquid also may be water. The water immediately steams in the ot common cumbustion chamber and the fuel immediately burns therein to provide the hot-air - gas for the expansion stroke of the piston of the engine.

Thus, FIG. 21 demonstrates a fuel container 806 including pretransporter 809 for transporting the pressed coal tape, wire, band, 807 towards the second transporter 805 which transports the coal fuel wire, tape, band, in a continuous flow through an inlet guide 804 into a combustion chamber 800, while a high pressure fluid, liquid, pump 808 is provided and attached to the arrangement of the fuel supply and the combustion chamber, and the said fluid pump supplies through a second inlet, nozzle, 803, a steady flow of high pressure fluid in the form of a speedy and strong pressurized jet 802, which is directed against the inflowing coal fuel stream 801 of said inlet guide 804, whereby said jet of liquid meets said inflowing coal fuel stream to pulverize it and spray it as a fine powder, 810, partially mixed with said fluid into said combustion chamber to provide a continuous and steady flow of burnable coal-fuel-fluid-mixture 810 for burning in the compressed air in said combustion chamber of said combustion angine at least as long as said combustion chamber is pressurrized with hot air and ready to supply and lead the burning or burned pressed air - coal fuel - fluid mixture into the respective expansion chamber with the respective expansion piston of said engine.

When the said liquid is water, it might vaporize to steam and transform to overheated steam inside of said combustion chamber for participation in the expansion and driving procedure with said hot air-fuel mixture in said expansion chamber of said engine.

My high-pressure fluid flow arrangement of FIG. 13 has the high pressure capability to be used as fluid pump 808 in the arrangement of FIG. 21. It may also be used to jet coal sludge or other difficult handling fuels into the combustion chamber 800 of FIG. 21 or to be used as fuel injection pump in conventional combustion engines.

Figure 22:
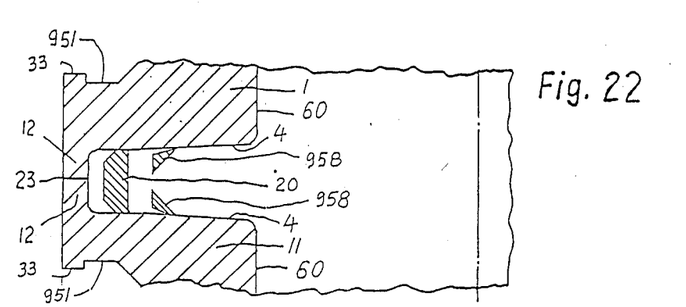

FIG. 22 shows in an enlarged scale, in which the support rings are illustrated separately, how a pair of elements with axially extending ring noses 12 laid together upon each other by faces 13 in the common face 23, are specifically sealed for very high pressures. The centering ring 20 is here moved somewhat inwards in order to see it separately removed from the ring noses 12. Note here that on the radial outer ends of ring 20 chamfers are provided to prevent a meeting of corners with the on its inner roots slightly rounded ring noses 12. Radially inwardly the centering ring 20 is cylindrical in this Figure. In order to prevent narrow openings between adjacent faces and entering of seal ring portions into them, in FIG. 22 radially inwards of the centering 20 are corner support rings 958 provided. They are again removed radially away in the Figure from the inner face of the centering ring in order to illustrate them separately. But actually their radial outer faces towards the seal ring and in addition inwardly tapered faces which take care thereof that the radial inner corners of these rings at all times meet the neighboring element 1 or 11, but that their radially outer portions remain slightly distanced from the elements 1, 11 in order to prevent that the elements might press against the mentioned outer portions of these rings and thereby open the radial inner corners. Because if the radial inner corners would depart from the elements the plastic seal rings would enter the then appearing gaps, become disturbed there and the sealing effect would be disturbed.

Figure 23:
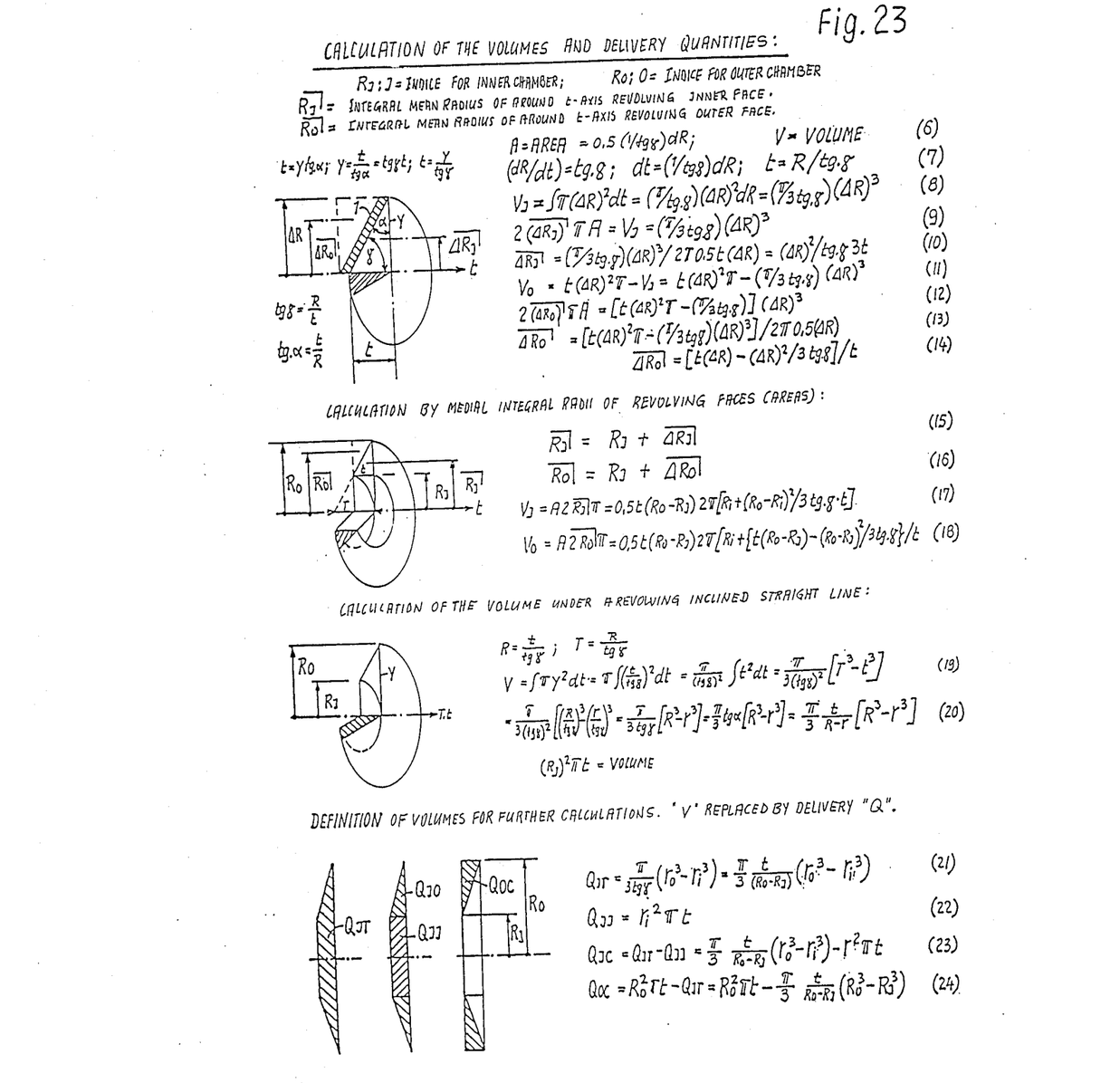

FIG. 23 shows how the inventor developed the presently valid equations for the delivery quantity of elements of the invention at their axial compression. Since all details of these developments are illustrated selfexplanatory in this Figure, a description of the Figure is here spared.

According to FIG. 23 the actual and accurate delivery of fluid when an element with outer and inner radii "R" and "r" is axially compressed by the stroke "t" is: pt,170

The calculations by the equations of FIGS. 17 and 18 teach that a high pressure element of the invention for pressures exceeding 1,000 atmospheres must have an axial thickness which exceeds thirty percent of the difference between the outer and inner radii of the element. For such high pressure the elements 1, 11 in FIG. 13 and their to them attached seal means are preferred to be those of FIGS. 6, 7, 14 and 22.

In FIG. 6 it is further illustrated that the end face 13 of the ring nose 12 of an element 1 or 11 may also be laid against an end face of a piston 66 or of a cover 6 of one or more of the outer Figures. This is especially done in such cases, where either only one single element 1 or 11 is used in the pump or when a plurality of pairs of elements are used and one of the elements forms an end of the set of elements. In such cases the end face 13 of the ring nose 12 of a respective element meets an end face, commonly a planar face 113 of an adjacent body, like a cover 6 of the pump or like a piston 66 of a pump. A respective sealing arrangement may then be added.

At the axial compression of the elements 1 or 11 certain internal stresses develop inside of the elements. These are at the radial inner and outer ends of the elements as higher the axially thicker the elements 1, 11 are. The result thereof is that the stresses become the highest in the axial ends of the ring noses 12, close to the end faces 13 of the ring noses. Consequently the ring noses are made axially relatively short. In practical applications of pressures exceeding 1,000 atmospheres in the working chamber 50, the axial length of the ring noses 12 should be shorter than one third of the axial thickness of the respective element 1, 11 on which the ring nose is provided.

FIG. 13 is an alternative portion of FIG. 8. That means that the piston of FIG. 8 may be together with its neighboring members be replaced in FIG. 8 by the piston and housing arrangement of FIG. 13. In such case FIG. 13 may have the same cover as FIG. 8. FIGS. 8 and 13 insofar belong together for an understanding of the invention. Similar members in FIGS. 8 and 13 have equal referential numerals.

While FIG. 13 is commonly used for different fluids, namely for a non-lubricating or corrosion providing fluid in the inner chamber 50, 37 and a lubricating fluid in the outer chamber 35, it is also possible to use the same fluid in the inner chamber 37 as is used in the outer chamber 35. Thereby it is possible to obtain a very high pressure oil from the outlet valve of the pump. If equal fluids are used in the inner and outer chambers 35 and 50, 37, any plasticly deformable seal ring radially of the seal seat 23 between the end faces 13, 113 of the ring noses 12 and the neighboring members 1, 11, 6, 66 can then be spared.

For mounting element 1 of Figure 6 against the top cover 6 of FIG. 6 (or 13) the element 1 will be turned 180 degrees, so, that the face 13 looks upwards. Double use of referential numerals in FIG. 13 defines the respective members as similar to those in FIGS. 8 and 11.

What is claimed, is:

1. A pump, comprising, in combination, a fluid containing working chamber (50) with inlet- and outlet-valves (69, 70) formed between at least one first hollow coned ring element (1, 11) and at least one closing wall portion (6, 7, 66, 1, 11) with said hollow coned ring and said chamber subjected to periodic axial compression and expansion by an arrangement which includes a reciprocating piston (66) which at least indirectly subjects said coned ring element and thereby said working chamber to periodically alternating compression and expansion, wherein an improvement is provided and includes the provision of a substantially cylindrically shaped, axially extending, ring nose provided on the radial outer portion of said coned ring element, extending in axial direction oppositionally directed relative to the axial direction of the cone of said coned ring element with said axially extending ring nose (12) ending in an axial end face (13), whereby a meeting face (23) is formed between said end face (13) and the face (13) which it meets, wherein a second coned ring element is laid with its radial outer portion and thereby with its end face of its axial extension against the end face of said axial extension of said first coned ring element to form by both of said end faces (13) a seal seat (23) for a fluid containing chamber (50) between said two coned ring elements, wherein a centering ring (20) of rigid material and of a radial extension of a small fraction of the radial extension of said coned ring elements is assembled radially of said seal seat (23) and thereby between portions of said coned ring elements (1 and 11), while a plastically deformable seal ring (26) is assembled radially inwardly of said centering ring in the direction remote from said seal seat, and, wherein said centering ring meets portions of faces of said ring noses of said coned ring elements and portions of the axial end faces of the coned portions of said coned ring elements.

2. The pump of claim 1,
wherein each said coned ring element has substantially an axial thickness which exceeds thirty percent of the difference between the outer and inner radii of each said coned ring element in order to make each said coned ring element resistant against pressures exceeding one thousand atmospheres in its cone.

3. The pump of claim 2,
wherein the axial length of said ring nose (12) is shorter than one third of the axial thickness of each said coned ring element (1, 11).

* * * * *